Figure 1:
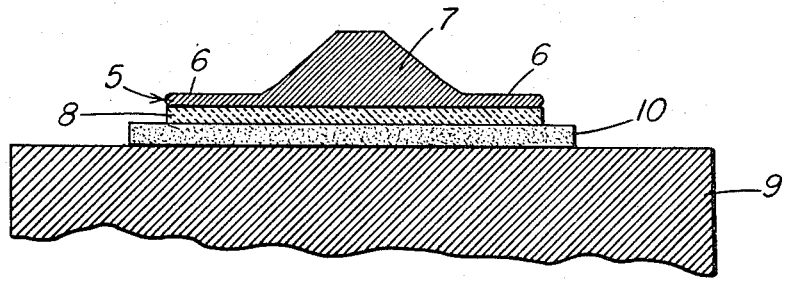

Aug. 27, 1968    A. P. LIMBACH    3,399,291

IMPULSE SEALING OF THERMOPLASTIC MATERIALS

Filed April 26, 1966

INVENTOR.
Anthony Paul Limbach

By Hastings S. Trigg
Attorney 3,399,291
IMPULSE SEALING OF THERMOPLASTIC
MATERIALS
Anthony P. Limbach, Somerset, N.J., assignor to Mobil
 Oil Corporation, a corporation of New York
Filed Apr. 26, 1966, Ser. No. 545,285
5 Claims. (Cl. 219—243)

This invention relates to the sealing of components made of thermoplastic material. It is more particularly concerned with an improved impulse heater for effecting sealing of thermoplastic materials.

As is well known to those familiar with the art, various methods are known and have been proposed to join thermoplastic materials. For example, hot bar sealing has been a well-established technique, particularly for sealing flat sections of relatively thin thermoplastic sheet material.

Another well-known method of joining thermoplastic materials is the so-called "impulse sealing" technique. In this method, a high resistance metal band, mounted on a block, is presented to a surface of a thermoplastic material to be joined by fusion to another thermoplastic material, backed by a backing block. A high voltage electrical current of short (impulse) duration is passed through the high resistance band to provide a momentary heating of the band to temperatures in the order of 500–600° F. At such temperatures, most thermoplastic materials are well above their fusion temperatures. Therefore, when the heated band is withdrawn, thermoplastic material will tend to adhere to the heated high resistance band and form undesirable strings and globules. In order to overcome this effect, resort has been had to screening or shielding materials, such as Teflon-coated fiberglass cloth. While this technique avoids the problem inherent in the direct contact of the heating element with the thermoplastic material, it introduces an adverse element of heat exchange and of durability of screening or shielding material. This results in vastly increased times of sealing cycles. Furthermore, the coated fiberglass protectant only lasts for about 20–30 cycles before it must be replaced, unless one uses lower temperatures and longer cycles.

Direct contact between the impulse heating element and the thermoplastic material, as aforementioned, has been disadvantageous. This disadvantage is particularly pronounced in cases wherein the two materials are to be joined in a corner relationship, such as in bonding square or rectangular end seals to rectangular container bodies. Because of variations in thickness of the plastics, high clamping pressure is necessary. As a result, when heat is applied, melted plastic will flow around and behind the heater wire, lifting it off the mounting block and also adhering to the wire.

It is the purpose and discovery of this invention to provide an impulse heating assembly that will permit excellent plastic bonding by direct contact of the heating element with the plastic. There has been developed a heating assembly that will restrict flow of plastic, which was previously encountered, without impairing the bond and that accomplishes the bonding operation in a minimum of time.

Figure 2:
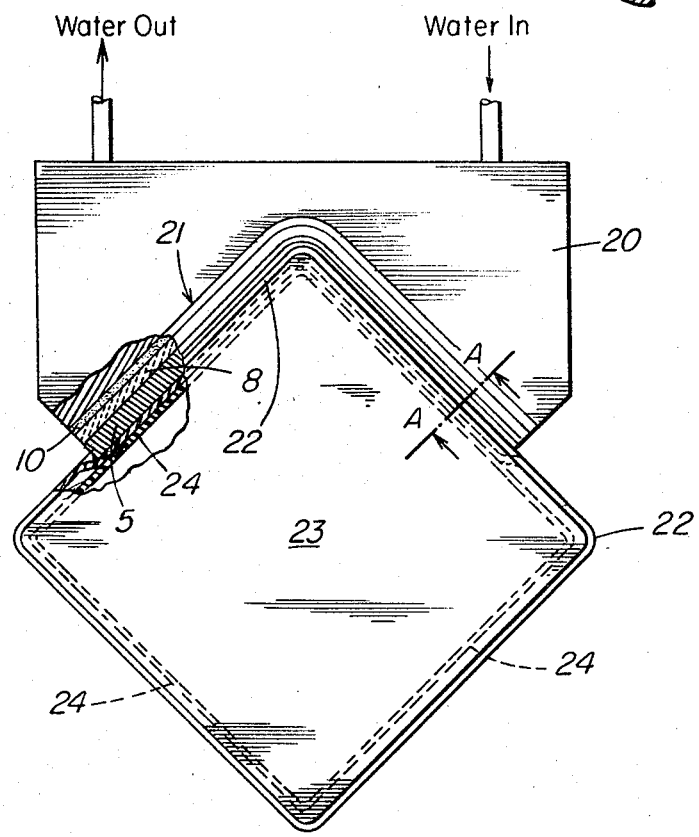
Figure 3:
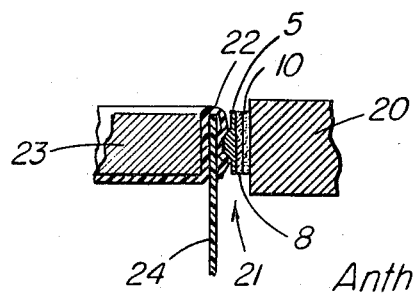

It is a broad object of this invention to provide an improved device for heat sealing thermoplastic materials. A specific object is to an impulse heating assembly which avoids excessive plastic flow and the problems attendant therewith. Other objects and advantages of this invention will become apparent to those skilled in the art, from the following detailed description considered in conjunction with the drawings, in which:

FIGURE 1 presents a sectional view of an embodiment of the heating assembly of this invention;

FIG. 2 shows a heat sealing system for sealing around the corners of a rectangular container, using the heating assembly of this invention; and FIG. 3 is a sectional view of the sealing operation taken along the plane A—A of FIG. 2.

This invention provides an impulse heating assembly comprising a band of metal, having high electrical resistance and coated on the back with a ceramic, mounted on a water-cooled block with a resilient adhesive having high heat resistance; said band of metal being relatively thin near the outer edges and having a thicker raised central section.

FIG. 1 shows a sectional view of the heating assembly. The heating element is a flat band or wire 5 made of a metal, such as Nichrome, that has high electrical resistance. This band has relatively thin sections 6 near the outer edges and has a thicker, raised center 7. The center section can be truncated as shown or it can have various other cross-sectional shapes, such as a flattened square or semi-circular. The essential point is that the heating band 5 must be thicker in the middle section.

The band 5 is coated on the back with a thin layer of a ceramic material 8. Alumina has been used successfully, but any ceramic can be used, if it will adhere to the metal. Preferably, the ceramic coating should be relatively rough and porous. Flame spraying is a preferred method for applying the ceramic coating. In general, the thickness of the ceramic coating will be between about 5 and about 10 mils. The purpose of the ceramic coating is to insulate the adhesive (infra) from the heating band 5 during the heating cycle.

The ceramic-backed heating band 5 is mounted on a cooled block 9 by means of an adhesive layer 10. The adhesive should be heat resistant and resilient. Silicone rubber adhesives are particularly preferred, but any adhesive having sufficient resiliency and heat resistance similar to that of the silicones can be used. The block 9 is made of a metal, such as aluminum, which will readily transfer heat. This block is cooled by any suitable means, such as by water-cooling.

When an electric current impulse is passed through the heating band 5, it heats up to temperatures of about 600° F. or higher. As a result of the shape of the band 5 and of the cooled block 9, however, heat is rapidly removed from the thinner band sections 6. Because of its greater heat capacity, the raised center section 7 will glow hot, while the sections 6 are relatively cool. Accordingly, when the band is placed in direct contact with the plastic to be sealed, the plastic in contact with the raised section 7 will melt and be penetrated by it, but plastic flow toward the edges of the heating band is virtually nil.

The application of the heating assembly of this invention to forming a seal around the corner of a square plastic container. A water-cooled block 20 shaped to conform to the corner section, has mounted on it a shaped ceramic coated heating band 21, as described with FIG. 1. Into a formed square plastic cover 22 is inserted a backup block 23. As shown in FIG. 3, the plastic container wall 24 is inserted into a channeled edge of the plastic cover. Then, the block 20 is moved toward the backup block 23 and pressure (about 50–200 p.s.i.) is applied so that the plastic cover-container wall assembly is firmly clamped between the backup block 23 and the heating band 21. An electric impulse is passed through the heating band for about ⅝ second, melting the plastic in contact with the raised center section of the band 21 and effecting the seal. The assembly is cooled and the now sealed cover and container are removed. Using high density polyethylene of about 17 mils thickness, the entire cycle time (heat sealing and cooling) is 1¾–2 seconds. In preferred practice, two heating assemblies are used on opposite corners.

After the opposite corners are sealed and half the adjacent sides, the plastic assembly is removed and rotated 90°. Then, the two unsealed corner areas are sealed. The entire operation to completely seal the cover on the container takes 4–5 seconds.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. An impulse heating assembly comprising a band of metal, having high electrical resistance and coated on the back with a ceramic material, mounted on a block, provided with cooling means, with a resilient adhesive having high heat resistance; said band of metal being relatively thin near the outer edges and having a thicker raised central section.

2. The heating assembly of claim 1, wherein said raised central section has a truncated cross-section.

3. The heating assembly of claim 2, wherein said metal is Nichrome and said block is a water-cooled aluminum block.

4. The heating assembly of claim 1, wherein said ceramic material is alumina.

5. The heating assembly of claim 3, wherein said ceramic material is alumina.

References Cited

UNITED STATES PATENTS

| | | | |
|---|---|---|---|
| 2,509,439 | 5/1950 | Langer | 219—243 X |
| 2,581,977 | 1/1952 | Spalding et al. | 100—93 |
| 2,712,343 | 7/1955 | Stanton | 156—583 |
| 2,730,161 | 1/1956 | Langer | 156—583 X |
| 3,054,441 | 9/1962 | Gex et al. | 156—515 |
| 3,113,198 | 12/1963 | Shinn | 156—583 X |

RICHARD M. WOOD, *Primary Examiner.*

C. L. ALBRITTON, *Assistant Examiner.*